United States Patent
Chen et al.

(10) Patent No.: US 6,903,485 B2
(45) Date of Patent: Jun. 7, 2005

(54) CLAW-POLE ALTERNATOR WITH NON-UNIFORM AIR GAP

(75) Inventors: Hanyang B. Chen, Ypsilanti, MI (US); Steven J. Yockey, Ypsilanti, MI (US); Michael T. York, Chelsea, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 8 days.

(21) Appl. No.: 10/442,332

(22) Filed: May 21, 2003

(65) Prior Publication Data

US 2004/0232799 A1 Nov. 25, 2004

(51) Int. Cl.[7] .......................... H02K 1/22; H02K 21/00; H02K 19/22
(52) U.S. Cl. ...................................................... 310/263
(58) Field of Search ............................. 310/263, 156.66

(56) References Cited

U.S. PATENT DOCUMENTS

| | | | |
|---|---|---|---|
| 3,271,606 A | 9/1966 | Collins | |
| 3,445,694 A | 5/1969 | Campbell et al. | |
| 4,972,114 A | 11/1990 | Frister | |
| 5,708,318 A | 1/1998 | Fudono | |
| 5,903,083 A | 5/1999 | Mukai et al. | |
| 5,903,084 A | 5/1999 | Asao et al. | |
| 6,133,669 A | * 10/2000 | Tupper | 310/263 |
| 6,150,746 A | * 11/2000 | Lechner | 310/181 |
| 6,333,582 B1 | * 12/2001 | Asao et al. | 310/263 |
| 6,426,581 B1 | * 7/2002 | York et al. | 310/263 |
| 2001/0000291 A1 | * 4/2001 | York et al. | 310/263 |
| 2002/0163274 A1 | * 11/2002 | Kusase et al. | 310/184 |

* cited by examiner

Primary Examiner—Tran Nguyen
(74) Attorney, Agent, or Firm—Brinks Hofer Gilson & Lione

(57) ABSTRACT

An alternator of the present invention includes a housing, a stator assembly mounted stationary within the housing, and a rotor assembly mounted rotatably within the housing in functional engagement with the stator assembly. An air gap extends annularly around the alternator between the rotor assembly and the stator assembly. The rotor assembly has a first end and a second end, and the air gap has a non-uniform thickness that varies along the axial length of the rotor assembly between the first and second ends of the rotor assembly. This non-uniform thickness is designed to avoid interference between rotor outer surface and stator inner surface at high rotor spin speed, but minimize the averaged air gap thickness for high alternator performance.

15 Claims, 5 Drawing Sheets

CLAW-POLE ALTERNATOR WITH NON-UNIFORM AIR GAP

TECHNICAL FIELD OF THE INVENTION

This invention relates to a claw-pole type alternator having a non-uniform air gap between the stator and rotor assemblies. More specifically, this invention relates to a rotor assembly for a claw-pole type alternator having pole fingers which are contoured to provide a non-uniform gap between the rotor assembly and the stator assembly of the alternator. The air gap at pole tip is designed larger than the air gap at the mid-point and root to provide high maximum speed limit of the claw-pole alternator, while the averaged air gap is designed small enough to provide high output electric power from the alternator.

BACKGROUND OF THE INVENTION

An automobile generator is a combination of a multi-phase claw-pole alternator and a rectifier. The alternator includes a rotor with a coil to provide exciting magnetic flux, and a stator with multiple phase windings for AC output currents. The rectifier is used to convert the AC currents to DC out current to charge the battery and support other electrical equipment within a vehicle. Almost all automobile alternators are claw-pole type alternators for their low rotor manufacturing cost, good power density, and high reliability.

In a vehicle, the alternator is driven directly by the engine accessory belt, and the alternator output current increases along with increases in engine speed. The most important criteria of an automotive alternator is DC output current at engine idle speed (about 550 rpm corresponding to an alternator speed of about 1600 rpm).

In an alternator, there is an air gap between the rotor and the stator to allow the moveable rotor to spin without touching the static stator core. This air gap has certain reluctance for magnetic flux. To maximize the output current of an alternator, the air gap should be designed as small as possible. The nominal air gap in a typical alternator is approximately 0.4 mm, however, the airgap can be significantly larger or smaller. When the air gap is reduced the output current is substantially improved.

However, the air gap of a claw-pole alternator should not be designed too small. When running at very high speeds, the alternator rotor poles will deflect due to centrifugal forces and the pole tip will touch the stator. Typically, the spin speed at which the deflected rotor pole fingers start to reach the stator inner diameter is the maximum speed limit of the alternator. Therefore, there is a minimum air gap limit in a claw-pole alternator. This minimum air gap equals the maximum rotor pole centrifugal deflection plus the manufacturing tolerance of the stator inside diameter and the rotor outside diameter. The designed air gap should not be smaller than the minimum air gap limit to prevent interference between the rotor and the stator at the designed maximum speed. Typically, the maximum speed is from 18,000 rpm to 22,000 rpm for most alternators on the market.

In recent years, more and more electrical and electronic loading has been added in vehicles. Automobile OEMs are requiring that future alternators provide much higher electrical power output than today's alternators and require that future alternators be the same size, or even smaller, than today's alternators. Therefore, a need exists for an improved alternator, which can withstand operating speeds on the order of 25,000 rpm without the risk of interference between the rotor assembly and the stator assembly. It is preferable that these machines have relatively small air gaps between the rotor and stator in order in achieve the power density required.

SUMMARY OF THE INVENTION

In accordance with a preferred embodiment of the present invention, an alternator includes a housing, a stator assembly mounted stationarily within the housing, and a rotor assembly mounted rotatably within the housing and in functional engagement with the stator assembly. An air gap extends annularly within the alternator between the rotor assembly and the stator assembly and has a non-uniform radial thickness or width that varies along the axial length of the alternator.

In another aspect, the present invention is a rotor assembly including a shaft defining an axis of rotation, first and second pole pieces mounted onto the shaft, each of the pole pieces includes a plurality of pole fingers circumferentially spaced about and extending axially from the first and second pole pieces generally parallel to the axis of rotation, and an excitation winding positioned between the first and second pole pieces.

In still another aspect of the present invention, an air gap is defined by the stator assembly and a contoured outer surface of the pole fingers. The contoured outer surface of the pole fingers being contoured such that the air gap increases gradually along the length of the pole fingers and has either a smooth profile or a stepped profile.

In yet another aspect of the present invention, an alternator includes a plurality of permanent magnets positioned on the first and second pole pieces. The permanent magnets are located between adjacent roots of the pole fingers. Also the tip of each of the first pole fingers extends axially to a position located over the permanent magnets mounted between the pole fingers of the second pole piece, and the tip of each of the second pole fingers extends axially to a position located over the permanent magnets mounted between the pole fingers of the first pole piece.

In still another aspect of the present invention, permanent magnets are mounted between adjacent pole fingers.

These and other aspects and advantages of the present invention will become apparent upon reading the following detailed description of the invention in combination with the accompanying drawings.

DETAILED DESCRIPTION

Figure 1:
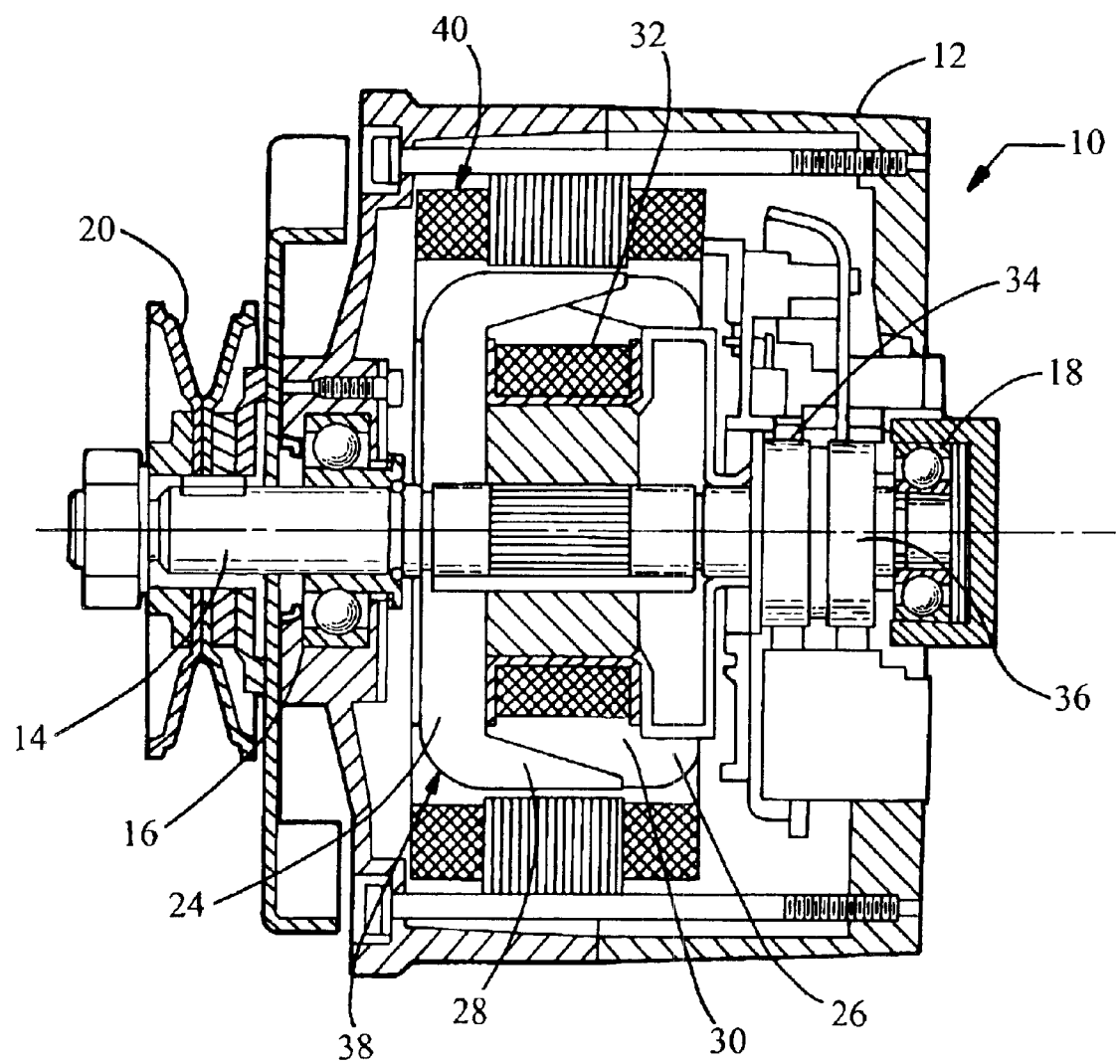
FIG. 1 is a sectional view of a prior art alternator.

In order to provide a framework for a detailed description of the preferred embodiments of this invention, FIG. 1 is presented illustrating a prior art alternator configuration. FIG. 1 illustrates an alternator 10 having a housing 12. An alternator rotor shaft 14 is supported within the housing 12 by rolling element bearings 16 and 18 and a belt driven pulley 20 is fastened to a protruding front end of the rotor shaft 14. Front and rear alternator pole pieces 24 and 26, respectively, are mounted to and rotate with the shaft 14. The pole pieces 24 and 26 have extending claw fingers 28, 30, respectively, interlaced to create the well known "claw pole" rotor configuration. An excitation winding 32 is carried within the cavity formed between the pole pieces 24, 26, and a DC excitation current is applied to the excitation winding 32 through a pair of slip rings 34, 36, and associated brushes (not shown). Although this type of alternator is shown, it should be understood that the present invention could also be implemented with alternators having brushless designs.

The pole pieces 24, 26, and the winding 32 constitute a rotor assembly 38, which produces an alternating polarity magnetic field that rotates with rotation of the rotor assembly 38. Although a DC excitation current is applied to the winding 32, the interlacing of the alternating poles 24, 26 creates an alternating polarity magnetic flux linkage. This magnetic flux linkage is presented to the winding 32 of a stationary stator assembly 40 located radially around the rotor assembly 38. The movement of the alternating polarity magnetic flux linkage presented by the rotor assembly 38 across stator windings of the stator assembly 40 generates electricity in a well-known manner.

Electrical energy output by the alternator 10 is directed to a rectifier (not shown), and perhaps further filtering and power conditioning devices, before being connected with the vehicle's electric distribution bus (also not shown). Sophisticated control systems, also known as voltage regulators, are used to apply an appropriate level of DC voltage to the excitation windings 32 to generate the desired RMS value of the outputted alternating current from the alternator 10, which can be in single phase or multi-phase form, depending on the winding design of the stator 40.

The stator assembly 40 and the rotor assembly 38 are positioned such that an air gap 42 extends annularly around the alternator 10 between the rotor assembly 38 and the stator assembly 40. The air gap 42 between the rotor assembly 38 and the stator assembly 40 has a uniform radial width, in static condition, along the axial length of the rotor assembly 38 between first and second ends 44, 46 thereof shown in FIG. 1. It is desirable to minimize this radial width of air gap to provide the best possible power density of the alternator 10.

Figure 2:
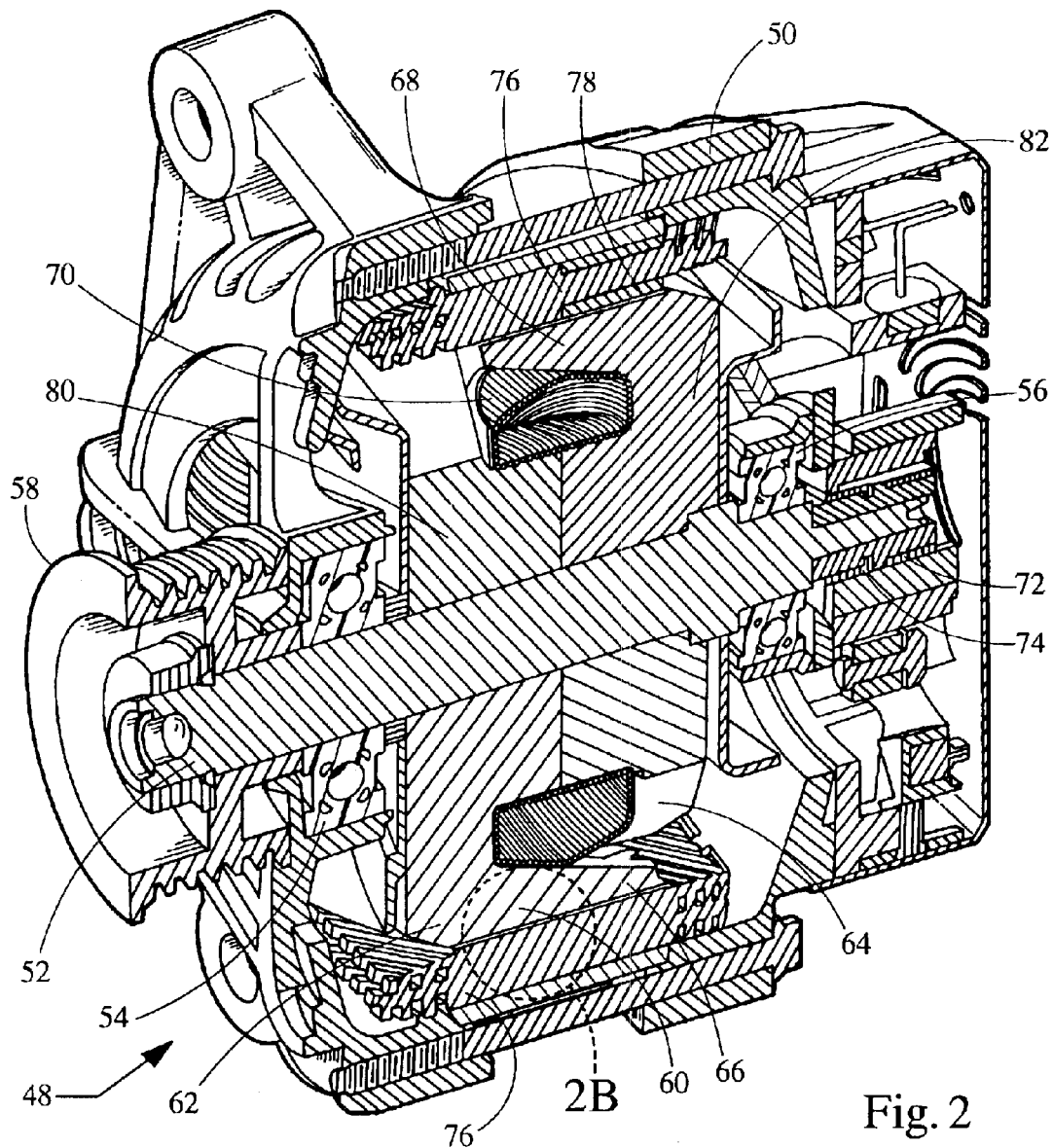
FIG. 2 is a cross sectional view of an alternator embodying the principles of the present invention.
Figure 2B:
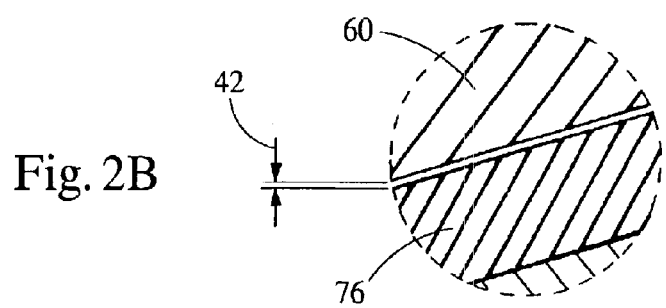

Referring to FIG. 2, an alternator embodying the principles of the present invention is shown therein and generally designated at 48. The alternator 48 is enclosed within a housing 50, and rotor shaft 52 is supported by rolling element bearings 54, 56 in the housing 50. A belt driven pulley 58 is fastened to an end of the rotor shaft 52 protruding from. The alternator 48 includes a rotor assembly 60 having first and second pole pieces 62, 64 that rotate with the shaft 52 and have extending first and second pole fingers 66, 68, respectively. The first and second pole fingers 66, 68 interlace with one another to create the well known "claw pole" rotor configuration. An excitation winding 70 is carried within the cavity formed between the pole pieces 62, 64, and the pole fingers 66, 68 and a DC excitation current is applied to the excitation winding 70 through a pair of slip rings 72, 74, and associated brushes (not shown).

Figure 3:
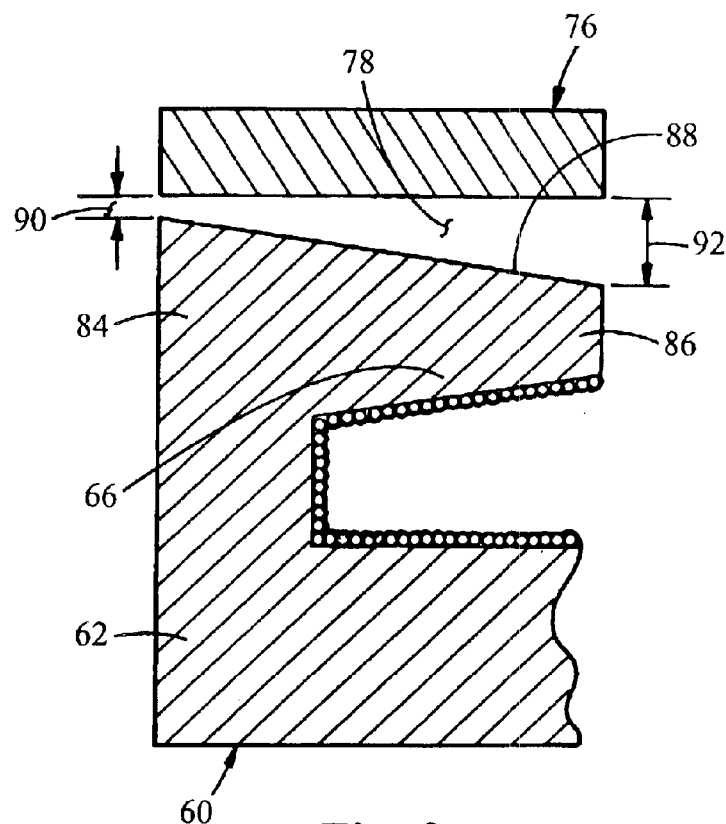
FIG. 3 is a schematic view of a pole finger of the rotor assembly and a portion of the stator assembly seen in the alternator of FIG. 2, wherein the outer surface of the pole finger has a smooth profile.

A stator assembly 76 is mounted stationary within the housing 50 in functional engagement with the rotor assembly 60. The stator assembly 76 and the rotor assembly 60 are positioned such that an air gap 78 extends annularly around the alternator 48 between the rotor assembly 60 and the stator assembly 76. Referring to FIG. 3, shown therein is the stator assembly 76 and a single pole finger 66 of the first pole piece 62 of the rotor assembly 60.

As mentioned above, the air gap 78 between the rotor assembly 60 and the stator assembly 76 has a non-uniform radial width that varies along the axial length of the rotor assembly 60 between first and second ends 80, 82 of the rotor 60. While a single finger 66 of the first pole piece is shown, it is to be understood that the profile shown is the same for all of the pole fingers 66, 68.

Each of the pole fingers 66, 68 has a root 84, a tip 86, and an outer surface 88. The air gap 78 between the rotor assembly 60 and the stator assembly 76 is defined as the distance between an inner surface 89 of the stator assembly 76 and the outer surfaces 88 of the first and second pole fingers 66, 68. The outer surfaces 88 of each of the first and second pole fingers 66, 68 are contoured such that the air gap 78 has a non-uniform radial width that varies along the axial length of each of the first and second pole fingers 66, 68 between the root 84 and the tip 86. Preferably, the thickness of the air gap 78 becomes gradually larger progressing from the root 84 axially to the tip 86.

Figure 4:
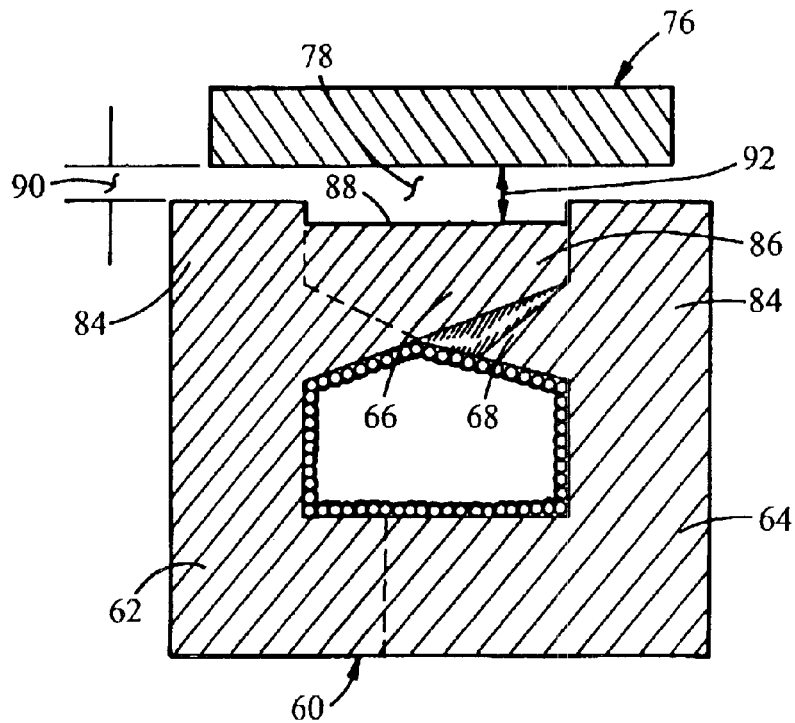
FIG. 4 is a schematic view, similar to FIG. 3, wherein the outer surface of the pole finger has a stepped profile.
Figure 5:
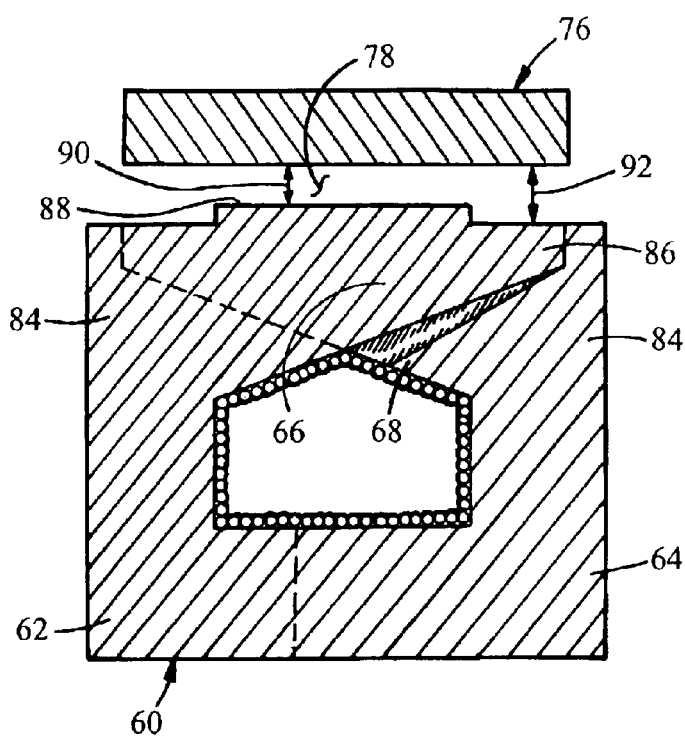
FIG. 5 is a schematic view similar to FIG. 4 of an alternative stepped profile.

The radial width of the air gap 78 has a first dimension 90 at the root 84 and increases to a second dimension 92, larger than the first dimension 90, at the tip 86. The second dimension 92 is typically designed to be within the range of 1.25 to 3 times the size of the first dimension 90. The radial width of the air gap 78 can increase as shown in FIG. 3, or alternatively, the contour of the outer surfaces 88 of the first and second pole fingers 66, 68 can be stepped. Referring to FIGS. 4 and 5, the radial width of the gap 78 has a first dimension 90 near the root 84, and steps to a second dimension 92 near the tip 86. Designs in FIGS. 4 and 5 are for convenient manufacturing of alternator rotor assemblies with non-uniform air gap concept.

In operation, as the rotor assembly 60 spins, the tips 86 of the pole fingers 66, 68 will deflect radially outward due to centrifugal forces. The radial deflections and pole root are much smaller than that at pole tip. The larger air gap 92 between the stator assembly 76 and the outer surfaces 88 of the pole fingers 66, 68 at the tips 86, will allow the pole fingers 66, 68 to deflect without causing interference between the stator assembly 76 and the rotor assembly 60. The small air gap 90 will make the average air gap between rotor outer surface and stator inner surface small, therefore, the output electric power from the alternator is large.

Figure 6:
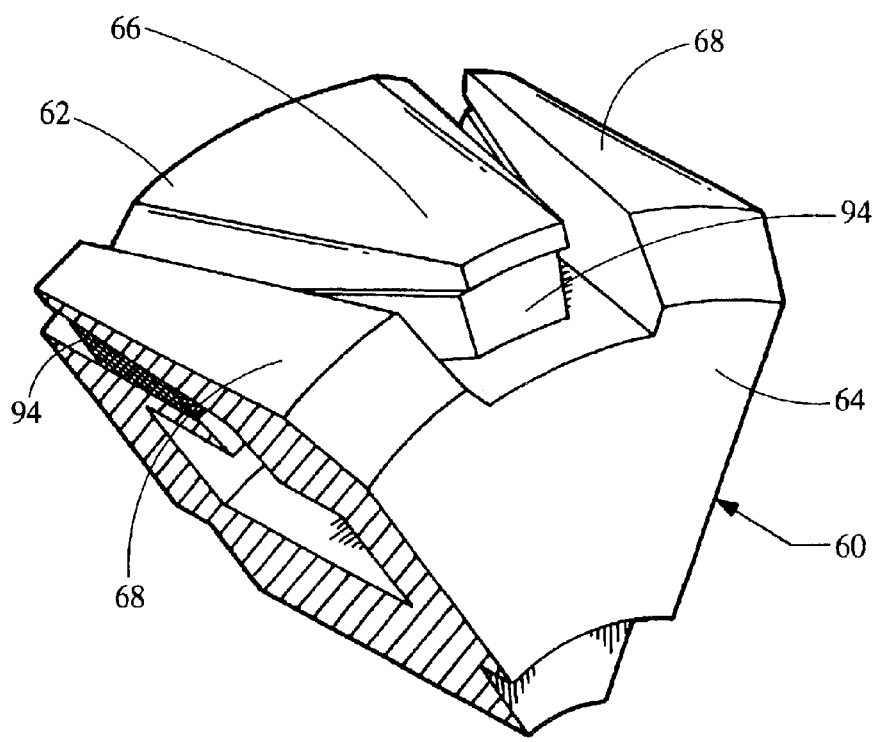
FIG. 6 is a perspective view of an alternator of the present invention having permanent magnets mounted between adjacent pole finger roots of a first pole.
Figure 7:
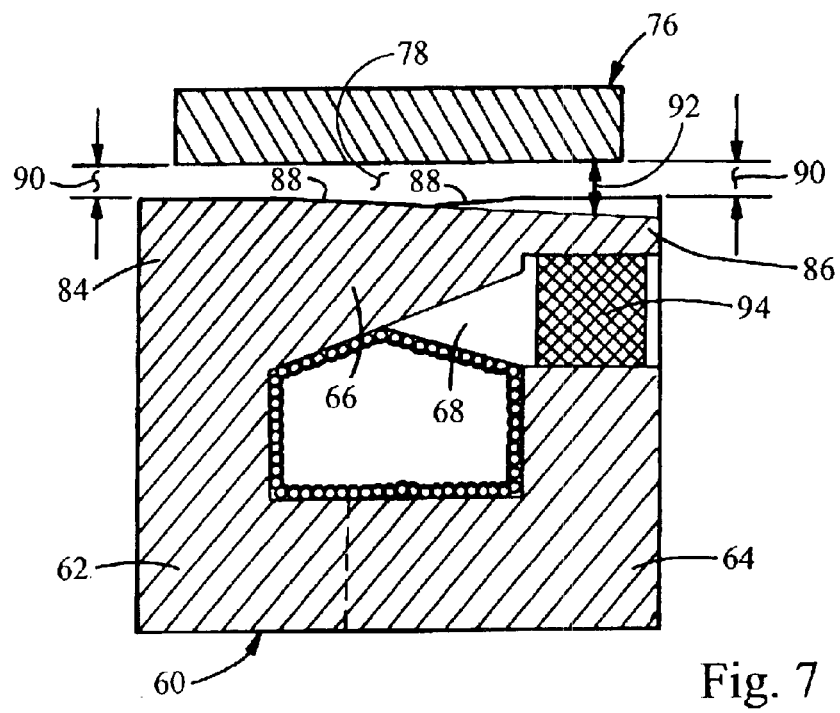
FIG. 7 is a sectional view of the alternator shown in FIG. 6.
Figure 8:
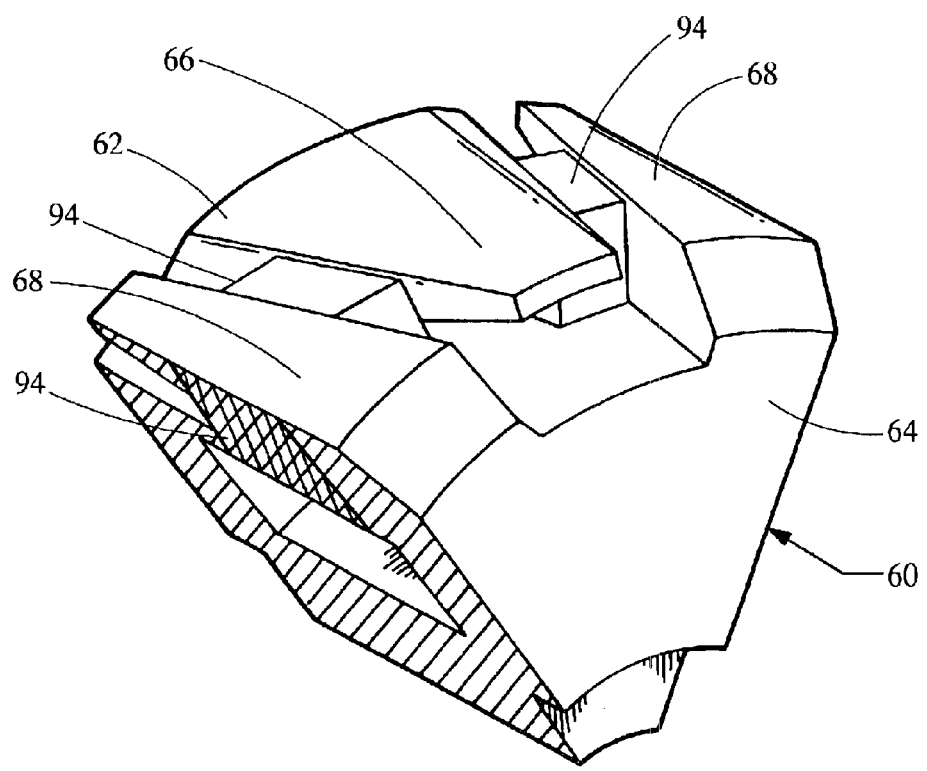
FIG. 8 is a perspective view of an alternator of the present invention having permanent magnets mounted between adjacent interlacing pole fingers.

Referring to FIGS. 6 and 7, the alternator 48 can include a plurality of permanent magnets 94 positioned on the first and second pole pieces 62, 64. The permanent magnets 94 are located between adjacent roots 84 of the first pole fingers 66 and between adjacent roots of the second pole fingers 68. The tip 86 of each of the first pole fingers 66 extends axially to a position located over the permanent magnets 94 mounted onto the second pole piece 64, and the tip 86 of each of the second pole fingers 68 extends axially to a position located over the permanent magnets 94 mounted onto the first pole piece 62. Referring to FIG. 8, in an alternative embodiment, permanent magnets are mounted between adjacent interlacing pole fingers.

Prior alternators have used permanent magnets. Typically, the permanent magnets will cause added deflection of the tips of the pole fingers due to the added centrifugal forces due to the addition of the magnets. Typically measures must be taken to prevent this added deflection. However, the non-uniform air gap 78 of the alternator 48 of the present invention will accommodate the deflection, thereby allowing the use of permanent magnets 94 without costly techniques to compensate for the added centrifugal forces.

As a person skilled in the art will recognize from the previous description and from the figures and claims, modifications and changes can be made to the preferred embodiment of the invention without departing from the scope of the invention as defined in the following claims.

What is claimed is:

1. An alternator comprising:
   a housing;
   a stator assembly stationarily mounted within said housing;
   a rotor assembly rotatably mounted within said housing and having a shaft, a first pole piece, a second pole piece, and an excitation winding;
   said shaft defining an axis of rotation;
   said first pole piece mounted onto said shaft, and including a plurality of first pole fingers circumferentially spaced about and extending axially therefrom generally in the direction of said axis of rotation;
   said second pole piece mounted onto said shaft coaxial with said first pole piece and having a plurality of second pole fingers circumferentially spaced about and extending axially therefrom generally in the direction of said axis of rotation;
   said excitation winding positioned between said first and second pole pieces;
   said rotor assembly being positioned relative to said stator assembly such that an air gap is defined between said rotor assembly and said stator assembly, and each of said first and second pole fingers having a root, a tip, and an outer surface, said air gap being defined as the distance between said stator assembly and said outer surfaces of said first and second pole fingers, said outer surfaces of each of said first and second pole fingers being is shaped such that the radial width of said air gap becomes gradually larger progressing from said root and extending to said tip, thereby providing space between said stator assembly and said rotor assembly for said tips of said pole pieces to deflect outward during operation of said alternator.

2. The alternator of claim 1 wherein the radial width of said air gap at said tip is in the range of approximately 1.05 times to 5 times the radial width of said air gap at said root and approximately 0.28 millimeters.

3. The alternator of claim 2 the wherein the radial width of said air gap at said tip is between approximately 1.2 times to 2 times the radial width of said air gap at said root.

4. The alternator of claim 1 wherein the thickness of said air gap at said root is in the range of approximately 0.20 millimeters and the thickness of said air gap at said tip is approximately 0.45 millimeters.

5. The alternator of claim 1 wherein said thickness of said air gap at said tip is approximately 0.01 mm to 0.60 mm larger than the said air gap at said root.

6. The alternator of claim 1 wherein the thickness of said air gap increases smoothly from said root to said tip of each of said first and second pole fingers.

7. The alternator of claim 1 wherein the thickness of said air gap increases in a stepped manner from said root to said tip of each of said first and second pole fingers.

8. The alternator of claim 1 further including a plurality of permanent magnets positioned on said first and second pole pieces and being located between adjacent roots of said first and second pole fingers, wherein the tip of each of said first pole fingers extends axially to a position located over said permanent magnets mounted onto said second pole piece, and the tip of each of said second pole fingers extends axially to a position located over said permanent magnets mounted onto said first pole piece.

9. The alternator of claim 1, further including a plurality of permanent magnets positioned on said first and second pole pieces being located between adjacent side surfaces of said first and second pole fingers.

10. A rotor assembly for a claw-pole type alternator comprising:
    a shaft defining an axis of rotation;
    a first pole piece mounted onto said shaft, and having a plurality of first pole fingers circumferentially spaced about and extending axially from said first pole piece generally along said axis of rotation, each of said first pole fingers having a root adjacent said first pole piece, a tip distal from said root, and an outer surface;
    a second pole piece mounted onto said shaft coaxial with said first pole piece and having a plurality of second pole fingers circumferentially spaced about and extending axially from said second pole piece generally along said axis at rotation, each of said second pole lingers having a root adjacent said first pole piece, a tip distal from said root, and an outer surface; and
    an excitation winding positioned between said first and second pole pieces;
    said outer surfaces of each of said first and second pole fingers having a profile between said root and said tip that varies in radial distance from said shaft such that said outer surface becomes gradually closer to said shaft progressing from said root and extending to said tip.

11. The rotor assembly of claim 10 wherein said cuter surface of each of said first and second pole pieces is smooth between said root and said tip.

12. The rotor assembly of claim 10 wherein said outer surface of each of said first and second pole pieces is stepped between said root and said tip.

13. The rotor assembly of claim 10 wherein said outer surface is a first radial distance from said shaft near said root; and a second distance from said shaft near the tip, said outer surface including a step between said that and second radial distances.

14. The rotor assembly of claim 10 further including a plurality of permanent magnets positioned on said first and second pole pieces and being located between adjacent roots of said first and second pole fingers, wherein the tip of each of said first pole fingers extends axially to a position located over said permanent magnets mounted onto said second pole piece, and the tip of each of said second pole fingers extends axially to a position located over said permanent magnets mounted onto said first pole piece.

15. The rotor assembly of claim 10 further including a plurality of permanent magnets positioned on said first and second pole pieces and being located between adjacent side surfaces of said pole fingers.

* * * * *